United States Patent Office 2,851,166
Patented Sept. 9, 1958

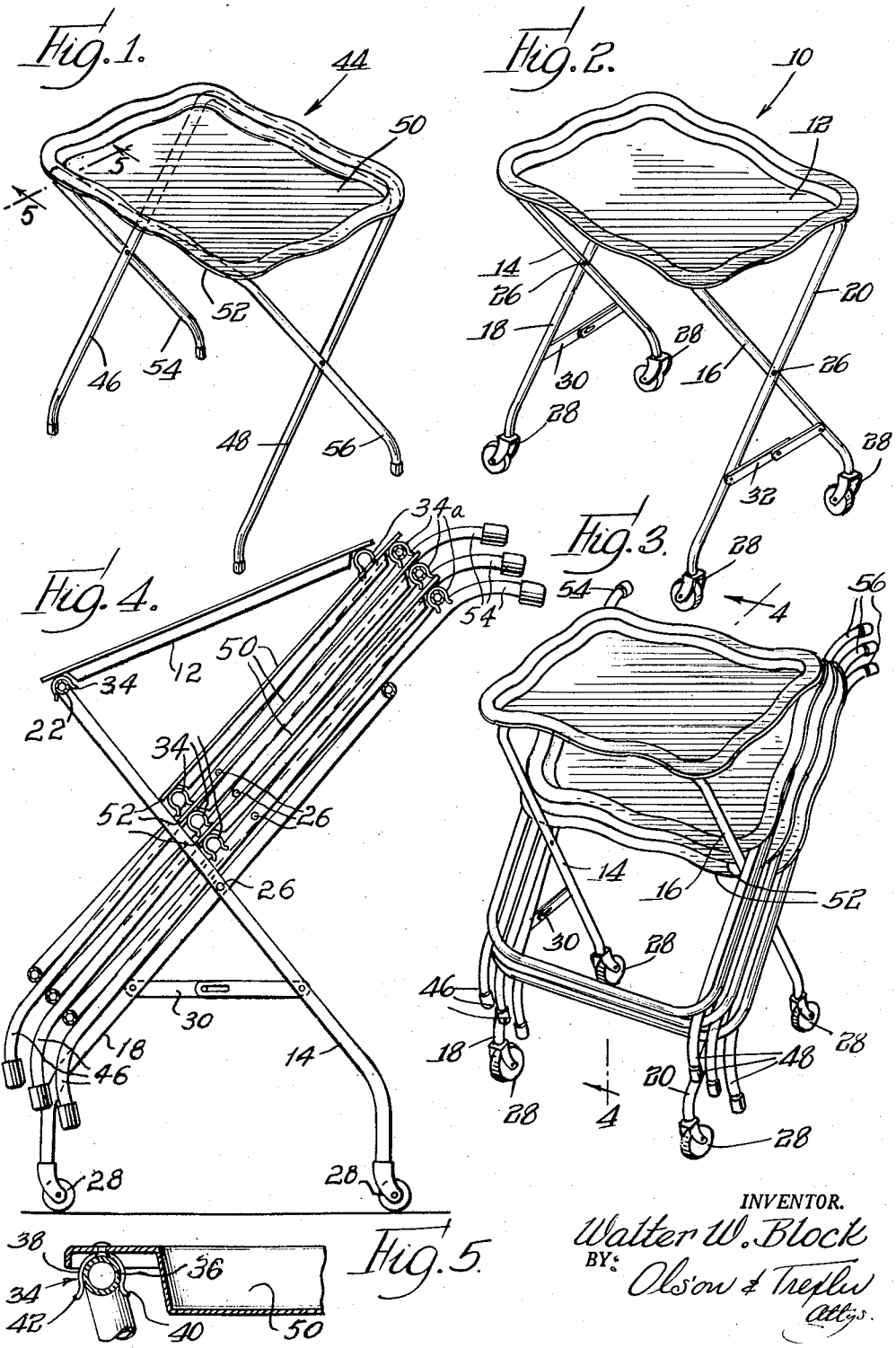

2,851,166

COMBINATION SERVING CART AND RACK FOR STACKED SERVING TABLES

Walter W. Block, Kenosha, Wis., assignor to Quaker Stretcher Company, Kenosha, Wis., a corporation of Wisconsin Application May 24, 1955, Serial No. 510,677

4 Claims. (Cl. 211—27)

The present invention relates to a combination serving cart and rack, and more particularly to a serving cart adapted for use as such, and also adapted for use as a rack for other serving tables.

Serving tables of the general type here involved have become a popular item of furniture in households throughout the country. With the advent of television and the desirability of serving foods and beverages in the "living" room of homes the necessity for such tables is apparent. They are generally of lightweight construction and may be readily moved from one place to another. Additionally, the tables are normally made collapsible so as to take up as little space as is possible when stored.

Despite the desirable features mentioned above, serving tables used heretofore have the disadvantage that they must be individually removed from their place of storage when brought into use, requiring multiple trips or inconvenience in handling. Additionally, despite their callapsibility, the tables are clumsy to store and take up valuable space in closets or other rooms. The invention herein contemplates providing a set of serving tables that is not subject to the disadvantages noted.

It is an object of this invention to provide a nest of serving tables for storage.

It is an object of the present invention to provide a serving table adaptable for use as a rack for storing other serving tables.

It is another object of the present invention to provide a wheeled serving table adapted for use as a rack for storing other serving tables and moving them to any desired location.

It is yet another object of the present invention to provide novel means for nesting the serving tables one upon the other when placing them on the serving table used as a rack.

It is still another object of the present invention to provide serving tables adapted to be carried by another serving table and nesting with other serving tables of similar structure.

These and other objects and advantages will be more apparent from the following detailed description and drawing, wherein:

Fig. 1 is a perspective view of a serving table forming part of the invention herein;

Fig. 2 is a perspective view of the serving table serving as a rack for the others;

Fig. 3 is a perspective view of the invention herein;

Fig. 4 is a sectional elevational view taken along the line 4—4 of Fig. 3; and

Fig. 5 is a fragmentary sectional view taken along the line 5—5 of Fig. 1.

Referring now more particularly to the drawings, wherein like numerals are used to designate similar parts throughout, there is shown in Fig. 2 a combination serving cart and storage rack 10. The serving cart 10 comprises a top or cart tray 12 and a supporting framework including four legs 14, 16, 18 and 20 formed in two pairs, each pair being joined by a tray supporting member or bight portion. Legs 14 and 16 are joined by bight portion 22 (Fig. 4), and legs 18 and 20 by bight portion 24. It will be seen that each pair of legs forms a substantially U-shaped frame member with the bight portion of the U comprising the tray supporting member, and the arms forming the legs. One of the bight portions, namely, 22, is shorter than the other bight portion 24, thereby permitting one of the U-shaped frame members to fit within the other. As will be seen in Fig. 2, the legs are crossed intermediate their lengths and are pivotally connected at their points of intersection by rivets 26. The legs are bent at their terminal portions so as to present a vertical section to receive casters 28 of conventional design. The bending of the legs also contributes to the beauty of the design of the serving tables.

The framework further includes folding braces 30 and 32 which are affixed respectively to legs 14 and 18, and 16 and 20. The braces limit spreading of the legs, and are pivotally connected by rivets or any other suitable means to the legs. The braces are connected below the points of intersection, approximately midway between the points of intersection and the casters 28.

The tray 12 is connected to the bight portions of the U-shaped members by means such as spring clips 34 as shown in Fig. 5. The clip is riveted to the tray 12 near the outer edge thereof, and includes arms 36 and 38 with flared ends 40 and 42. The bight portions 22 and 24 are inserted into the clips from the open ends thereof, causing the arms 36 and 38 to spread apart. The clip frictionally holds the bight portions 22 and 24. Four clips are provided, two of them engaging each of the bight portions at spaced apart positions. It is to be noted that the spring clips 34 permit pivoting of the tray relative to the bight portions so that one edge of the cart tray may be disconnected from its associated bight portion and the tray then pivoted on the other bight portion.

The invention also contemplates the provision of a plurality of serving tables 44, as shown in Fig. 1. These tables are of substantially the same structure as the serving cart 10 previously described and to avoid repetition will not be described in detail, though each includes a pair of U-shaped frame elements joined at one end by bight portions which releasably support the edges of the serving trays 50 by similar clips 34a. The tables 44 differ from the serving cart 10 in that they have different structural dimensions for the U-shaped members, and additionally do not have braces 30 and 32. The purpose in deleting the braces will be described in connection with the operation of the invention. It is also to be noted that the serving tables 44 do not have casters 28. Each serving tray 50 is wider than the corresponding distance between a bight portion and the pivotal connections between the legs thereof.

Referring now to Fig. 3, it will be seen that the tables 44 may be collapsed and fitted one upon the other on the supporting framework of the serving cart 10. In order to stack the tables 44 as shown in Fig. 3, each of the tables 44 is first collapsed. This is accomplished by detaching one side of the tray 50 from the bight portion thereunder and rotating the U-shaped element so released in such a manner that the four legs of the table are in approximately parallel, oppositely extending relationship. The terminal position of the two U-shaped elements is such that the bight portions of the U-shaped elements are opposite each other. More particularly, the legs are spread so that their ends are opposite each other. At the same time as the legs are spread, the tray is moved downwardly so that it engages and lies flat against the legs of the U-shaped element to which it is still affixed.

This operation is repeated for each of the tables 44, and in their collapsed position they are ready to be placed on the rack consisting of the supporting framework of the serving cart 10.

To adapt the serving cart 10 to be used as a rack, it is first necessary to detach the cart tray 12 from the bight portion 24. After disconnecting the tray from bight portion 24 it will be apparent that it is still affixed to the other bight portion 22 and carried by the spring clips 34. The braces 30 and 32 will preclude the legs of serving cart 10 from spreading and the framework assumes its normal configuration.

At this point, the detached edge of the cart tray 12 is elevated and the serving tables 44 are collapsed and lifted to a position resting on the frame member legs 18, 20, as shown in Fig. 3. As will be seen in Fig. 3 the first of the tables 44 rests with the legs 46 and 48 engaging legs 18 and 20 of the serving cart. The tray 50 of the serving table 44 has the front edge thereof 52 engaging the legs 14 and 16 of the serving cart 10.

To have the legs 46 and 48 of the serving table 44 rest on the legs 18 and 20 of the serving cart 10, it is of course necessary that the legs 46 and 48 be sufficiently spread to fit over legs 14 and 16 of the serving cart 10, and at the same time sufficiently close together to be retained on legs 18 and 20. As mentioned previously, the tray 12 is pivoted on bight portion 22, and after each serving table 44 has been placed on the framework of serving cart 10, the tray 12 may be released so that the free edge thereof rests on the adjacent serving tray of serving table 44. It will thus be apparent that legs 46 and 48 are spaced the same distance apart as are legs 18 and 20, and that the legs 54 and 56 are spaced further apart.

It will be seen in Fig. 4 that each of the tables 44 may be placed one upon the other as shown. All of the tables 44 being of similar construction, they will fit one upon the other and may be conveniently carried by the supporting framework of serving cart 10. It is to be noted that either edge of tray 50 may be detached from its underlying bight portion and the operation of the device is not affected thereby. Since the width of serving trays is greater than the distance between a bight portion and the leg pivots of the U-shaped frame elements, the lower edges of the trays 50, as seen in Fig. 4, rest upon the legs 14, 16 of the cart and thus position the opposite edges of the serving trays 50 above the bight portion 24 of the cart so that these elevated edges of the serving trays may be grasped for manipulating the assembly; and further the edges of the trays 50 resting on the legs 14, 16 also maintain the lower portions of the collapsed frame elements above the supporting surface over which the cart is to be moved.

Having assembled the serving cart and rack, as heretofore described, it is apparent that the invention herein provides a convenient way of storing a plurality of serving tables. Because of the casters 28, on the serving cart 10, the rack may be moved from one room to another without individually lifting the tables. The device serving as a cart or rack may also be used as a serving table after the other serving tables have been removed therefrom, thereby providing a rack without the necessity of an additional structure for that purpose.

It is contemplated that the tray will be made of inexpensive sheet material, and that the legs will be formed of tubular sheet metal. The device is therefore made of inexpensive materials which may be suitably decorated to conform with the individual requirements of the persons using it. The bent ends of the leg members of the serving tables 44 also provide a convenient handle for pushing the rack into any desired location.

As a modification of the invention herein, the legs 54 and 56 of the serving table 44 could rest on legs 14 and 16 of serving cart 10, with legs 46 and 48 of the serving table 44 between them, thereby providing a reversal of parts. This modification has the advantage that the serving tables 44 could be placed on the cart 10 without moving them over the tray 12.

Although a specific embodiment of the invention has been shown and described, it is to be understood that such description is for illustrative purposes only. The invention is to be limited only by the appended claims.

The invention is hereby claimed as follows:

1. In combination with a plurality of similar collapsed serving tables each including a pair of U-shaped frame elements with the legs thereof crossed and pivotally interconnected and a serving tray releasably supported on one of the bight portions and pivotable on the other bight portion of the pair of frame elements, there being one tray for each pair of frame elements and each tray being wider from one bight portion to the other than the distance from a bight portion to the corresponding pivotal connections, said frame elements being collapsible together upon release of the serving tray from one bight portion thereof permitting pivotal movement of the frame elements to collapsed position with the legs substantially parallel and with the released edge of the serving tray disposed intermediate the ends of the collapsed frame elements and below the corresponding pivotal connections; the provision of a convertible serving cart and storage rack for a plurality of said serving tables in collapsed and stacked position, and said convertible cart and storage rack comprising a pair of substantially identical U-shaped frame members of substantially the same size as the frame elements of said serving tables and having bight portions disposed in the same horizontal plane with the depending legs of one frame member crossed and pivotally interconnected with the legs of the other frame member at positions corresponding to the pivotal connections of the table frame elements, a cart tray of substantially the same size as the serving trays mounted on said bight portions of said frame members in horizontal position to provide a serving cart and having a releasable connection with at least one of said bight portions to permit pivotal movement of the adjacent edge of the cart tray away from the adjacent bight portion to provide a storage space between the cart tray and bight portion to stack a plurality of said collapsed serving tables on the frame member from which the cart tray was released, the serving trays being supported in an inclined position with an edge against one of the cart frame members and resting against the other cart frame member, the width of said serving trays relative to the spacing from the pivotal connection of the frame elements to which the serving trays remain attached spacing the lower portions of the folded legs of the serving tables above the surface supporting said serving cart and rack with the upper edges of the serving tables extending above the upper portions of the frame members to provide readily accessible handle means, the released edge of the cart tray resting on the uppermost serving tray, and anti-friction means at the ends of the legs of the frame members of said serving cart and storage rack facilitating movement of the storage rack and assembled serving tables by manipulation of said handle means.

2. The combination of claim 1, wherein the free end portions of the legs of the U-shaped frame elements are inclined toward the vertical when in tray supporting position whereby, when the frame elements are collapsed for stacking on the storage rack with legs thereof extending upwardly, the end portions of the upwardly extending legs project angularly away from the adjacent edges of the serving trays and provide side handles further facilitating manipulation of the assembly.

3. The combination of claim 1, wherein the anti-friction means at the ends of the legs of the frame members comprises caster wheels.

4. In combination with a plurality of collapsed serving tables each including a pair of U-shaped frame elements with the legs thereof crossed and pivotally interconnected and with the end portions of the legs deflected toward a vertical direction in tray supporting position, and a serving tray releasably supported on the bight portions of each of the frame elements which may be collapsed together upon release of the serving tray from one bight portion permitting pivotal movement of the frame elements to collapsed position with the free ends of the legs projecting in opposite directions and with the released edge of the serving tray disposed intermediate the ends of the collapsed frame elements; the provision of a convertible serving cart and storage rack for a plurality of said serving tables in collapsed and stacked position, and said convertible cart and storage rack comprising a pair of substantially identical U-shaped frame members each having a bight portion for disposition in the same horizontal plane and depending legs of one frame member crossed and pivotally interconnected with the legs of the other frame member, a cart tray mounted on said bight portions of said frame members in horizontal position to provide a serving cart and having a releasable connection with at least one of said bight portions to permit pivotal movement of the adjacent edge of the cart tray away from the adjacent bight portion to provide a storage rack with a passage between the cart tray and bight portion to stack a plurality of said collapsed serving tables on the frame member from which the cart tray was released, the legs of the collapsed serving tables between the adjacent bight portion of the frame members and the edge of the cart tray released therefrom projecting beyond the said bight portion and the assembled trays with the upper end portions of the legs projecting substantially horizontally to provide readily accessible handle means, and anti-friction means at the ends of the legs of the frame members of said storage rack facilitating movement of the storage rack and assembled serving tables by manipulation of the said handle means.

References Cited in the file of this patent

UNITED STATES PATENTS

| | | |
|---|---|---|
| 892,083 | Rawlinson | June 30, 1908 |
| 1,046,631 | Nelson | Dec. 10, 1912 |
| 1,692,704 | Rohrig | Nov. 20, 1928 |
| 2,514,735 | Wilson et al. | July 11, 1950 |
| 2,591,797 | Exline et al. | Apr. 8, 1952 |
| 2,666,681 | Adler | Jan. 19, 1954 |
| 2,676,709 | Walsh | Apr. 27, 1954 |
| 2,709,120 | Tuttle | May 24, 1955 |